(12) United States Patent
Ishigure

(10) Patent No.: US 9,620,919 B2
(45) Date of Patent: Apr. 11, 2017

(54) PROCESS FOR PRODUCING SHIELD LAYER-CUT ELECTRIC WIRE

(71) Applicant: Asahi Seiki Co., Ltd., Gifu-shi (JP)

(72) Inventor: Kanji Ishigure, Gifu (JP)

(73) Assignee: Asahi Seiki Co., Ltd., Gifu-shi (JP)

( * ) Notice: Subject to any disclaimer, the term of this patent is extended or adjusted under 35 U.S.C. 154(b) by 428 days.

(21) Appl. No.: 14/297,028

(22) Filed: Jun. 5, 2014

(65) Prior Publication Data

US 2015/0357094 A1 Dec. 10, 2015

(51) Int. Cl.
*H01B 13/20* (2006.01)
*H01R 43/28* (2006.01)
*H02G 1/12* (2006.01)

(52) U.S. Cl.
CPC ........... *H01R 43/28* (2013.01); *H02G 1/1256* (2013.01); *H02G 1/1282* (2013.01); *H02G 1/128* (2013.01); *H02G 1/1297* (2013.01); *Y10T 29/49119* (2015.01)

(58) Field of Classification Search
CPC .. H02G 1/1202; H02G 1/1212; H02G 1/1256; H02G 1/1273; H02G 1/1282; H02G 1/128; H02G 1/1297; H01R 43/28; H01R 9/032; Y10T 29/49119; Y10T 29/49123; Y10T 29/49174; Y10T 29/49194
USPC .............................. 29/828, 854, 857; 174/34
See application file for complete search history.

(56) References Cited

U.S. PATENT DOCUMENTS

| | | | | |
|---|---|---|---|---|
| 4,368,576 A | * | 1/1983 | Smit | H02G 1/1202 29/828 |
| 4,763,410 A | * | 8/1988 | Schwartzman | H02G 1/1212 29/828 |
| 6,330,839 B1 | * | 12/2001 | Amrein | H02G 1/1273 29/828 |
| 7,228,625 B1 | * | 6/2007 | Zerebilov | H01R 9/032 174/34 |

FOREIGN PATENT DOCUMENTS

JP 2012-110112 A 7/2012

* cited by examiner

*Primary Examiner* — Donghai D Nguyen
(74) *Attorney, Agent, or Firm* — Shumaker, Loop & Kendrick, LLP

(57) ABSTRACT

A simplified process for producing a shield layer-cut electric wire that does not damage an insulating layer and a core wire and when cutting a shield layer.

2 Claims, 7 Drawing Sheets

PROCESS FOR PRODUCING SHIELD LAYER-CUT ELECTRIC WIRE

TECHNICAL FIELD

The present invention relates to a process and apparatus for producing a shield layer-cut electric wire.

BACKGROUND ART

An electric wire such as a shield wire is composed mainly of a core wire, an insulating layer (internal coating layer) which coats the periphery thereof, a shield layer (braid) which coats the periphery of the insulating layer, and a protective coating layer which coats the periphery of the shield layer. When this electric wire is connected to various electric apparatuses and the like for use, it is necessary to cut and pull out the protective coating layer and shield layer for removal thereof. However, while cutting and pulling out the protective coating and shield layers, the core and insulating layers are often damaged, which ultimately results in additional problems such as change in electric properties of the electric wire.

Generally the outermost protective coating layer is cut with a cutting machine and pulled out, and then a thin plate-like insertion member is inserted between the shield layer and the insulating layer thus displacing the shield layer from the insulating layer. Then, the floating shield layer (i.e., the displaced shield layer) is cut with a cutting machine along the insertion member. Thus, preventing or reducing damage to the insulating layer associated by cutting.

However, the above described process requires a complex and troublesome step of inserting the inserting member between the closely-adhered shield layer and the insulating layer for cutting.

On the other hand, a process for producing a shield layer-cut electric wire of Patent Document 1 shown in FIG. 7 is known as another process for easily cutting a shield layer. In this process, a shield diameter expanding means compresses a shield wire 400 in an axial direction from both sides of an exposed portion of the shield layer 430 so that the shield layer 430 swells, as shown in FIG. 7 (*a*). Then, a space is created between the shield layer 430 and an internal coating layer (insulating layer) 420, as in an E-E cross section shown in FIG. 7 (*b*). In that state, laser light is applied in a tangential direction of the cross section of the shield layer 430, and goes around an outer periphery of the shield layer 430, thereby making it possible to cut the shield layer 430 alone without damaging the internal coating layer 420.

However, in this process, the laser light must be precisely controlled to prevent laser light application to the internal coating layer 420. Also, the space between the shield layer 430 and the internal coating layer 420 must be set at such a level that laser light and radiation heat would not influence or affect the internal coating layer 420. Further, when the type of shield wire has been changed, if the laser is not accurately reset, the laser light may be applied to the internal coating layer 420, thereby damaging the internal coating layer 420.

PRIOR ART DOCUMENT

Patent Document

Patent Document 1: Japanese Patent Application No. 2010-256438

SUMMARY OF THE INVENTION

Therefore, the present invention provides a simplified process and apparatus for producing a shield layer-cut electric wire, which does not damage the insulating layer (internal coating layer) and the core wire when cutting the shield layer.

To solve the above-described problem, disclosed herein is a process for producing a shield layer-cut electric wire wherein, in an electric wire having a shield layer and a coating layer applied to the outer periphery thereof, the shield layer has been cut. This process is characterized by making a notch in the coating layer of the electric wire and separating the coating layer at the notch from the shield layer by moving the notch in an axial direction such that the shield layer becomes exposed This process may include the steps of: causing the coating layers on both sides of the exposed shield layer to relatively approach each other, thereby applying force in the axial direction of the shield layer so that the shield layer is swollen (e.g., displaced) in the radial direction of the electric wire; pushing down the swollen shield layer toward the outer face of the coating layer; and cutting the pushed-down shield layer on the outer face of the coating layer as a base. In certain aspects, the disclosed method includes the steps of (i) cutting a portion of the outer coating; (ii) separating ends of the outer coating at the cut portion in an axial direction to expose the underlying shield layer; (iii) applying force in the axial direction of the electrical cable such that the exposed portion of the underlying shield layer buckles outward in the radial direction of the electric cable; (iv) folding the buckled portion of the underlying shield layer over a portion of the outer coating; and (v) cutting the folded and buckled portion of the underlying shield layer.

According to the above-described feature, it is possible to push down the shield layer toward the outer face of the coating layer, and to easily cut the shield layer on the outer face of the coating layer as a base. Also, the insulating layer and the core wire present on the inside of the shield layer are protected by the coating layer during cutting of the shield layer, and would not be damaged by a cutting machine.

Next, the process for producing a shield layer-cut electric wire of the present invention is characterized in that in the step of pushing down the swollen shield layer toward the outer face of the coating layer, the swollen shield layer is pushed down toward the outer face of the separated coating layer.

According to the above-described feature, the separated coating layer is an unnecessary portion, and can be effectively utilized as a base at the time of cutting.

Next, an apparatus for producing a shield layer-cut electric wire of the present invention wherein, in an electric wire having a shield layer and a coating layer applied to the outer periphery thereof, the shield layer has been cut, is characterized by comprising, with respect to the electric wire wherein a notch is made in the coating layer, and the coating layer separated by the notch is moved in the axial direction so that the shield layer is brought in an exposed state, a swelling means which causes the coating layers on both sides of the exposed shield layer to relatively approach each other, thereby applying force in the axial direction of the shield layer so that the shield layer is swollen in the radial direction of the electric wire; a pushing-down means which pushes down the swollen shield layer toward the outer face of the coating layer; and a cutting means which cuts the pushed-down shield layer on the outer face of the coating layer as a base.

According to the above-described feature, the shield layer is pushed down toward the outer face of the coating layer, and cut on the outer face as a base. Thus, the insulating layer present on the inside of the shield layer would not be damaged, and the shield layer can be easily cut in a simple way.

As stated above, according to the process and apparatus for producing a shield layer-cut electric wire of the present invention, the insulating layer would not be damaged, and the shield layer can be easily cut in a simple way.

BRIEF DESCRIPTION OF THE DRAWINGS

FIG. 4 (b) is an A-A cross sectional view of FIG. 4 (a) and FIG. 4 (c) is a B-B cross sectional view of FIG. 4 (a).

FIG. 5 (b) is a C-C cross sectional view of FIG. 5 (a).

FIG. 6 (b) is a D-D cross sectional view of FIG. 6 (a).

FIG. 7 (b) is an E-E cross sectional view of FIG. 7 (a).

DETAILED DESCRIPTION

Figure 1:
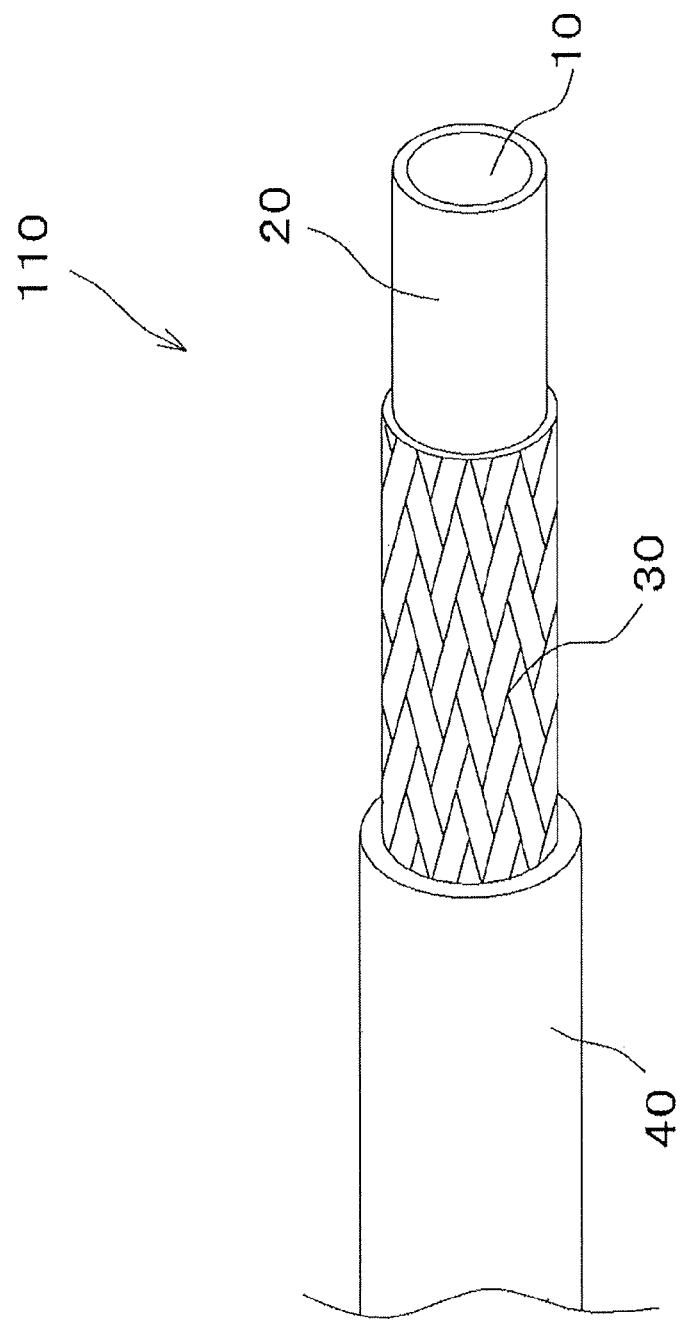
FIG. 1 shows a shield layer-cut electric wire in which the shield layer has been cut, and then a coating layer at the tip end has been pulled out and removed, by a process or apparatus for producing a shield layer-cut electric wire of the present invention.

FIG. 1 shows a shield layer-cut electric wire 110 in a state where a shield layer 30 of an electric wire 100 has been cut, and then a separated coating layer 40 at the tip end has been pulled out and removed, by a process 200 or apparatus 300 for producing a shield layer-cut electric wire of the present invention. This shield layer-cut electric wire 110 has a substantially circular cross section, and has a metallic core wire 10 in the center thereof, an insulating layer 20 (internal coating layer) so as to wrap the periphery of the core wire 10, a shield layer 30 having a braid structure of thin metal wires such as copper wires so as to wrap the periphery of the insulating layer 20, and an outermost coating layer (protective coating layer) 40 so as to wrap the periphery of the shield layer 30.

Hereinafter, the process 200 for producing a shield layer-cut electric wire of the present invention and the apparatus 300 for producing a shield layer-cut electric wire which operates in accordance with the producing process 200 will be explained in detail.

Figure 2:
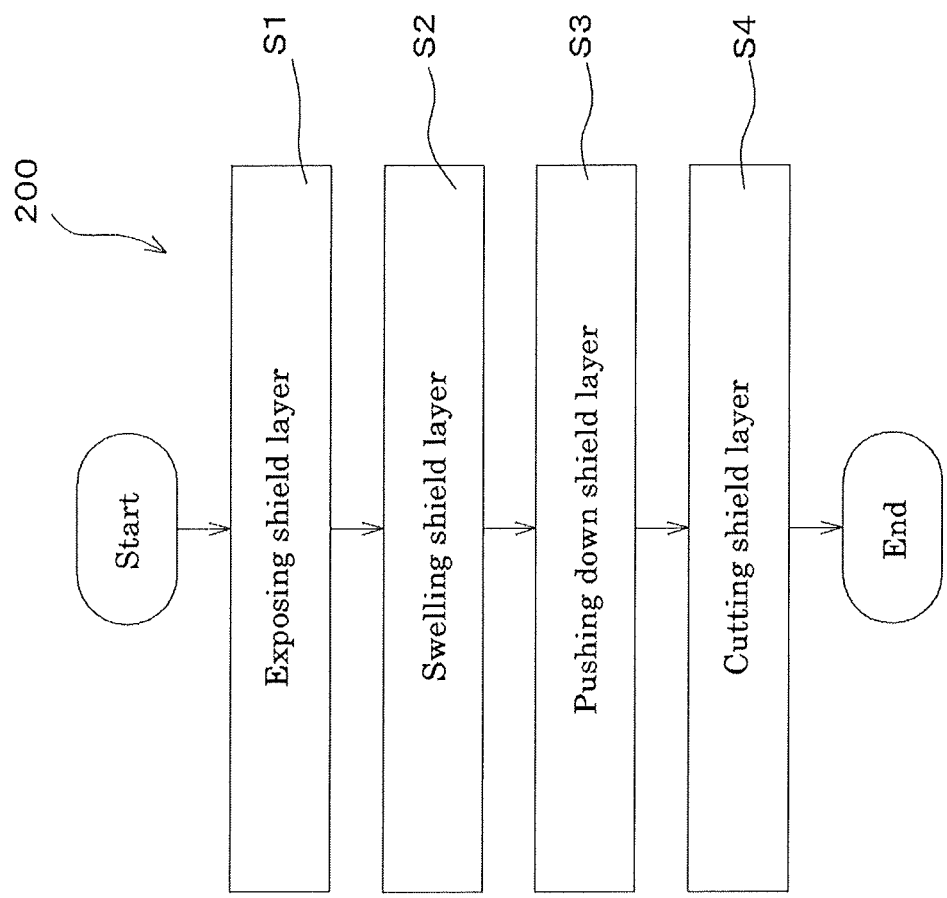
FIG. 2 shows a flow diagram indicating the steps of the process for producing a shield layer-cut electric wire of the present invention.

Firstly, FIG. 2 shows the steps of the producing process 200 of the present invention. The producing process 200 includes steps S1 through S4, which are described further below. The first step S1 includes making a notch in the coating layer 40 of the electric wire 100 and moving the separated coating layer 40 in the axial direction, thereby exposing the shield layer 30.

Next, during the second step S2, the coating layers 40 on both sides of the exposed shield layer 30 are made to approach each other (e.g., pushed together) such that the shield layer 30 is swollen (e.g., displaced) in the radial direction of the electric wire 100. Next, during step S3, the swollen shield layer 30 is pushed down toward the outer face of the coating layer 40, and during the fourth step S4, the pushed-down shield layer 30 is cut on the outer face of the coating layer 40 as a base. In certain aspects, the process may be started from the second step S2 while the electric wire 100 has a shield layer 30 that has already been exposed in place of performing the first step S1.

Next, the producing apparatus 300 which operates in accordance with the first step S1 to the fourth step S4 will be explained in view of FIG. 3 to FIG. 6.

Figure 3:
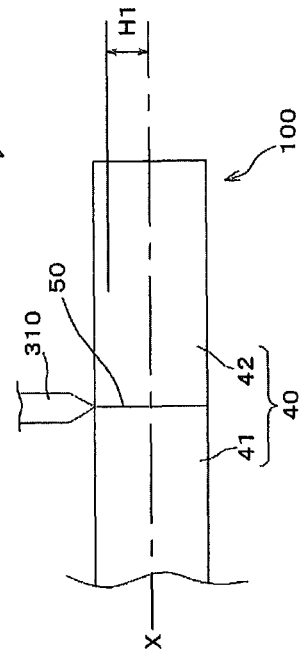
FIG. 3 (a) and FIG. 3 (b) are conceptual views in which the shield layer of an electric wire is exposed by a producing apparatus which implements the process for producing a shield layer-cut electric wire of the present invention.
Figure 3:
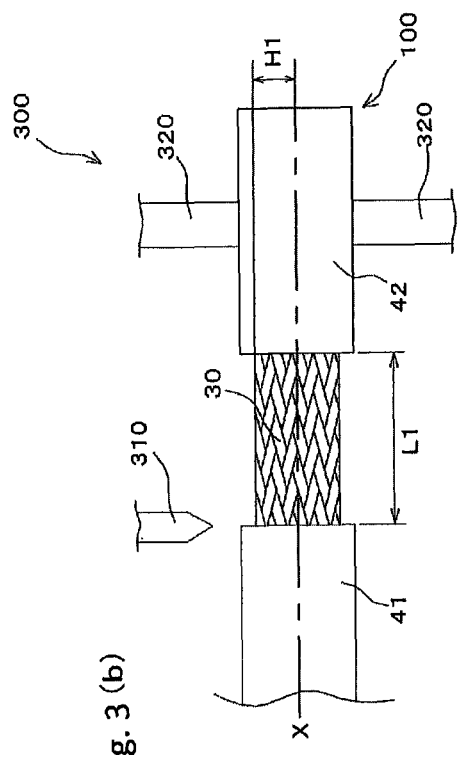
Figure 4:
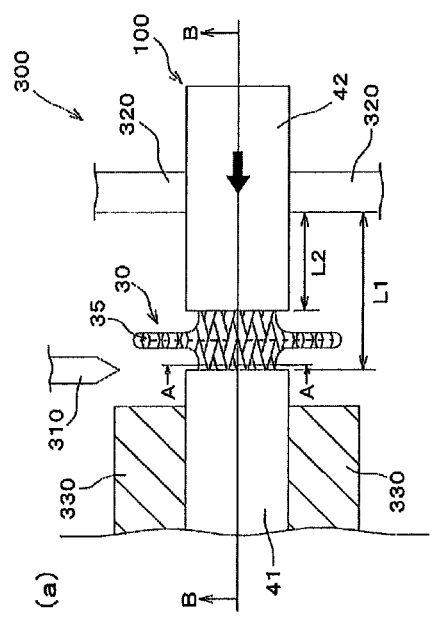
FIG. 4 (a) is a conceptual view in which the shield layer is being swollen (e.g., displaced) in the radial direction of the electric wire by the producing apparatus which implements the process for producing a shield layer-cut electric wire of the present invention.
Figure 4:
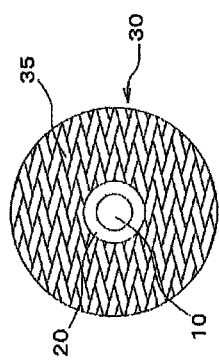
Figure 4:
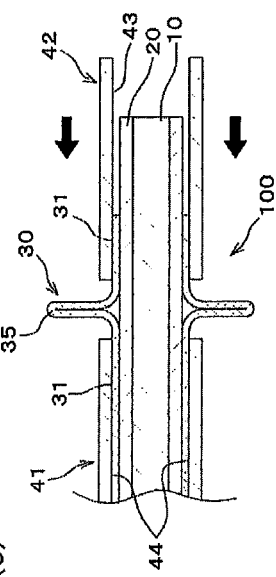

The producing apparatus 300 may include, for example, a cutting device 310, a moving device (chuck) 320 (see FIG. 3) and a fixing device (collet) 330 (see FIG. 4). As shown in FIG. 3, the first step S1 of exposing the shield layer 30 is realized by using the cutting device 310 and the moving device 320.

Specifically, as shown in FIG. 3 (a), the tip end side of the elongated electric wire 100 is inserted into the producing apparatus 300, and the cutting device 310 makes a notch 50 vertically to the center axis X of the electric wire 100. This notch 50 is made in the coating layer 40 alone, and does not contact the inside shield layer 30. Next, a tip end-side coating layer 42 of the coating layer 40 is separated from a main body-side coating layer 41 on the base side.

The amount (depth) of notching by the cutting device 310, in other words, the distance from the center axis X of the electric wire 100 to the point at which the tip end of a blade edge of the cutting device 310 arrives is defined as H1. H1 is set to be a distance from the center axis X of the electric wire 100 to an internal face 43 of the coating layer 42 (which may be an outer face 31 of the shield layer), and thus the cutting device 310 can cut the coating layer alone.

Also, this cutting device 310 cuts the coating layer 40 alone while going around the periphery of the electric wire 100, but any other cutting means which can be conceived of by those skilled in the art may be used, such as a cutting device which makes a notch while holding the coating layer 40 with a cutting blade from the top and bottom of the electric wire 100.

Next, as shown in FIG. 3 (b), the moving device 320 holds the separated tip end-side coating layer 42 from top and bottom to move it toward the tip end side of the electric wire 100 in the axial direction (right side in the figure) by a distance L1. Then, the shield layer 30 is exposed by the distance L1 moved. In the meantime, the moving device 320 grips the tip end-side coating layer 42 by holding it from top and bottom, but, without limitation to this, any gripping means which can be conceived of by those skilled in the art may be used, for example, a gripping means which grips the tip end-side coating layer 42 by enclosing the outer periphery thereof.

In the meantime, it is also possible not to implement the first step S1 shown in FIG. 3 (*a*) and FIG. 3 (*b*) in the producing apparatus 300. That is, the electric wire 100 in a state where the shield layer 30 is exposed, as shown in FIG. 3(*b*), may be inserted into the producing apparatus 300 without implementation of the step.

Next, as shown in FIG. 4, the second step S2 of swelling the shield layer 30 in the radial direction of the electric wire 100 is realized by the moving device 320. Specifically, as shown in FIG. 4 (*a*), the moving device 320 moves the tip end-side coating layer 42 being held toward the base side in the axial direction (left side in the figure) by a distance L2. In the meantime, the fixing device 330 fixes the main body-side coating layer 41 while gripping it from the periphery thereof at that time in order that the main body-side coating layer 41 does not move. Also, a means for fixing the main body-side coating layer 41 may be alternatively used in place of the fixing device 330.

Here, when the tip end-side coating layer 42 moves to the base side by friction between the internal face 43 of the tip end-side coating layer 42 and the outer face 31 of the shield layer 30 (see FIG. 4 (*c*)), force is applied to the exposed shield layer 30 toward the base side in the axial direction (left side in the figure). Thus, the exposed shield layer 30 would also move toward the base side in the axial direction.

However, the shield layer 30 cannot move while going into the internal face side of the main body-side coating layer 41 due to friction between an internal face 44 of the main body-side coating layer 41 and the outer face 31 of the shield layer 30. Therefore, the exposed shield layer 30 has no room for escape, and thus is swollen or displaced in the radial direction of the electric wire 100 to form a swollen part 35, as shown in FIG. 4 (*a*) to FIG. 4 (*c*). Thus, the moving device 320 serves as a swelling means for swelling (e.g., displacing) the shield layer 30 in the radial direction of the electric wire 100.

FIG. 4 (*b*) shows an A-A cross sectional view of FIG. 4 (*a*), from which it can be understood that the shield layer 30 is swollen and expanded in an approximately disk shape in the radial direction of the electric wire 100. In the meantime, the tip end-side coating layer 42 is made to approach the main body-side coating layer 41 to swell the shield layer 30, but, without limitation to this, any method which can be conceived of by those skilled in the art may be employed so long as both the coating layers relatively approach each other, for example, a method of causing the main body-side coating layer 41 to approach the tip end-side coating layer 42 or a method of moving both the main body-side coating layer 41 and tip end-side coating layer 42 so that they approach each other to swell the shield layer 30.

FIG. 4 (*c*) shows a B-B cross sectional view of FIG. 4 (*a*), from which it can be understood that the right-side and left-side shield layers 30 are bent and swollen in the radial direction around the center of the exposed shield layer 30. In the meantime, the frictional force between the internal face 43 of the tip end-side coating layer 42 and the outer face 31 of the shield layer 30 is sufficient so long as the shield layer 30 can move following the tip end-side coating layer 42. Also, for example, when the frictional force is weak, the force may be appropriately controlled, for example, by increasing the grip force of the moving device 320.

Figure 5:
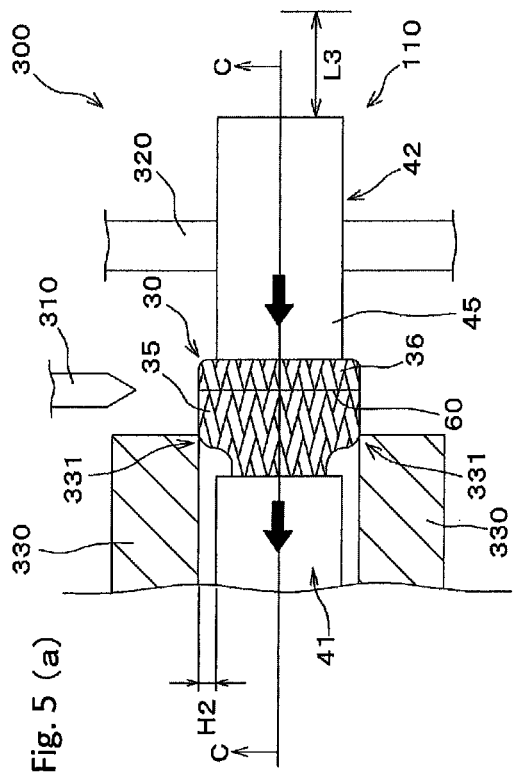
FIG. 5 (a) is a conceptual view in which the swollen shield layer is pushed down toward the outer face of the coating layer, and the pushed-down shield layer is being cut on the outer face of a coating layer as a base, by the producing apparatus which implements the process for producing a shield layer-cut electric wire of the present invention.
Figure 5:
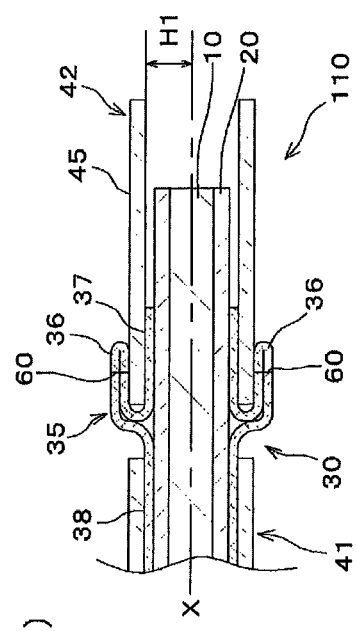

Next, as shown in FIG. 5, the third step S3 for pushing down the shield layer 30 toward the outer face of the coating layer 40 is realized by the moving device 320 and fixing device 330.

Specifically, the moving device 320 further moves the tip end-side coating layer 42 toward the base side in the axial direction by a distance L3 from the state shown in FIG. 4 (*a*). At this time, the grip force of the fixing device 330 which has fixed the main body-side coating layer 41 in order that it does not move is relaxed. That is, the force is relaxed so that the internal face of the fixing device 330 is distant from the outer periphery of the main body-side coating layer 41 by a gap H2. Then, not only the tip end-side coating layer 42, but also the shield layer 30 and main body-side coating layer 41 integrally, i.e., the entire electric wire 100 would move toward the base side in the axial direction.

When the entire electric wire 100 moves toward the base side in the axial direction (left side in the drawing), the swollen part 35 of the shield layer 30 is contacted with a tip end part 331 of the fixing device 330. Thus, the swollen part 35 is pushed down toward an outer face 45 of the tip end-side coating layer 42 by the tip end part 331 to wrap the tip end of the tip end-side coating layer 42 as shown in FIG. 5 (*a*). In this manner, the tip end part 331 of the fixing device 330 serves as a pushing-down means for pushing down the swollen part 35 toward the outer face 45 of the tip end-side coating layer 42.

In the meantime, while the tip end-side coating layer 42 is moved by L3 by the moving device 320, this distance L3 is set within such a range that the swollen part 35 can be pushed down toward the outer face 45 of the tip end-side coating layer 42 by the tip end part 331 and also can be cut by the cutting device 310.

Also, the entire electric wire 100 moves toward the base side (left side in the figure) in the axial direction so that the swollen part 35 is pushed down by the tip end part 331. However, without limitation to this, any means which can be conceived of by those skilled in the art may be employed so long as it can pushes down the swollen part 35, for example, the tip end part 331 of the fixing device 330 moves toward the tip end side (right side in the figure) to push down the swollen part 35 or the swollen part 35 is manually pushed down.

Next, the fourth step S4 for cutting the swollen part 35 on the outer face of the coating layer 40 as a base from the state where this swollen part 35 is pushed down is realized by the cutting device 310. As shown in FIG. 5 (*a*) and FIG. 5 (*b*), the cutting device 310 makes a notch 60 vertically to the center axis X of the electric wire 100 so that the tip end 36 of the swollen part 35 is cut. Then, as shown in FIG. 5 (*b*), the shield 30 is separated into a tip end-side shield layer 37 on the side of the tip end-side coating layer 42 and a main body-side shield layer 38 on the side of the main body-side coating layer 41. In the above manner, the shield layer-cut electric wire 110 in which the shield layer 30 has been cut is produced.

In the meantime, any cutting means which can be conceived of by those skilled in the art may be employed, for example, a cutting means which makes a notch while holding the swollen part 35 with a cutting blade from the top and bottom of the electric wire 100, in addition to the cutting method in which the cutting device 310 cuts the swollen part 35 while going around the periphery of the electric wire 100.

Also, the swollen part 35 of the shield layer 30 is pushed down toward the outer face 45 of the tip end-side coating layer 42 to cut the swollen part 35 with the cutting device 310 from the upper side thereof. However, the cutting manner is not limited to this, and, for example, the swollen part 35 may be pushed down toward the outer face of the main body-side coating layer 41 by some pushing-down means from its tip end side (right side in the figure) in the state shown in FIG. 4 (*a*), and cut by the cutting device 310 from the upper side thereof.

Also, as shown in FIG. 5 (*b*), the outer face 45 of the tip end-side coating layer 42 is used as abase during cutting. Thus, even if the notch 60 has been made also in the surface of the outer face 45, the notch would not be made in the insulating layer 20. Further, the tip end-side shield layer 37 located on the inside of the tip end-side coating layer 42 coats the insulating layer 20, and thus, the insulating layer 20 is protected by the tip end-side shield layer 37 even if the cutting device 310 has cut the tip end-side coating layer 42.

That is, the insulating layer 20 is double-protected by the tip end-side coating layer 42 and tip end-side shield layer 37. Thus, according to the present invention, it is possible to form a complete double protection structure to not damage the insulating layer 20 during cutting of the shield layer 30. Also, since such a protection structure can be formed, a wide variety of cutting devices can be used, in addition to the cutting device 310.

Further, the tip end-side coating layer 42 and tip end-side shield layer 37 are unnecessary portions to be disposed of, and thus there is no problem, no matter how they are damaged by notching. Conversely, such unnecessary portions can be effectively utilized during cutting.

Also, as shown in FIG. 5 (*a*), the cutting device 310 (see FIG. 3 (*a*)) which has cut the coating layer 40 of the electric wire 100 can be utilized as it is also during cutting of the swollen part 35, and thus it is unnecessary to replace the cutting device.

Further, when the distance from the center axis X of the electric wire 100 to the point at which the tip end of a blade edge of the cutting device 310 is set to be H1 as in the case where the coating layer 40 alone is cut by the cutting device 310 (see FIG. 3 (*a*)), or to be slightly greater within such a range that the swollen part 35 can be cut, the cutting device 310 can cut the swollen part 35 without damaging the insulating layer 20. Therefore, it is possible to easily deal with cutting without changing the operation setting of the cutting device 310 or by only slight changes, in the first step S1 (see FIG. 3) and fourth step S4 (see FIG. 5).

Figure 6A:
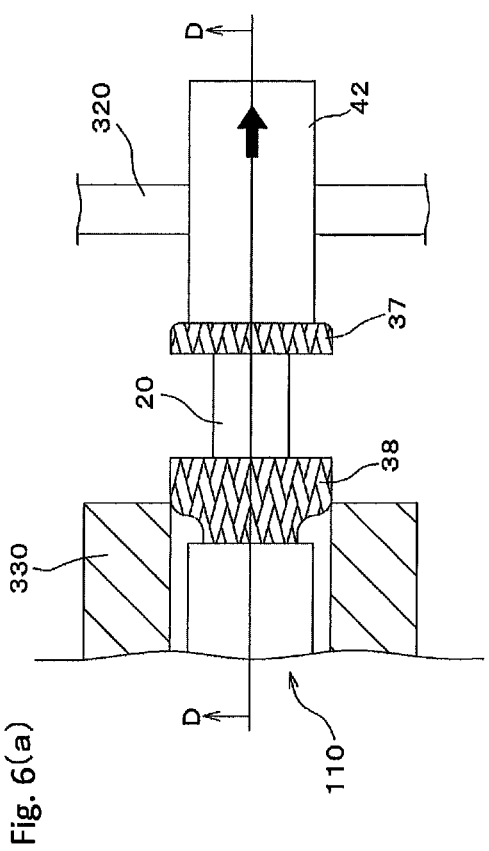
FIG. 6 (a) is a conceptual view in which the shield layer has been cut, and thereafter is being pulled out and removed together with the coating layer, by the producing apparatus which implements the process for producing a shield layer-cut electric wire of the present invention.
Figure 6B:
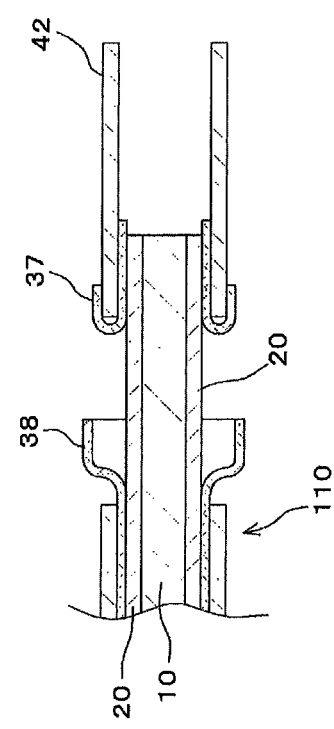
Figures 7A, 7B:
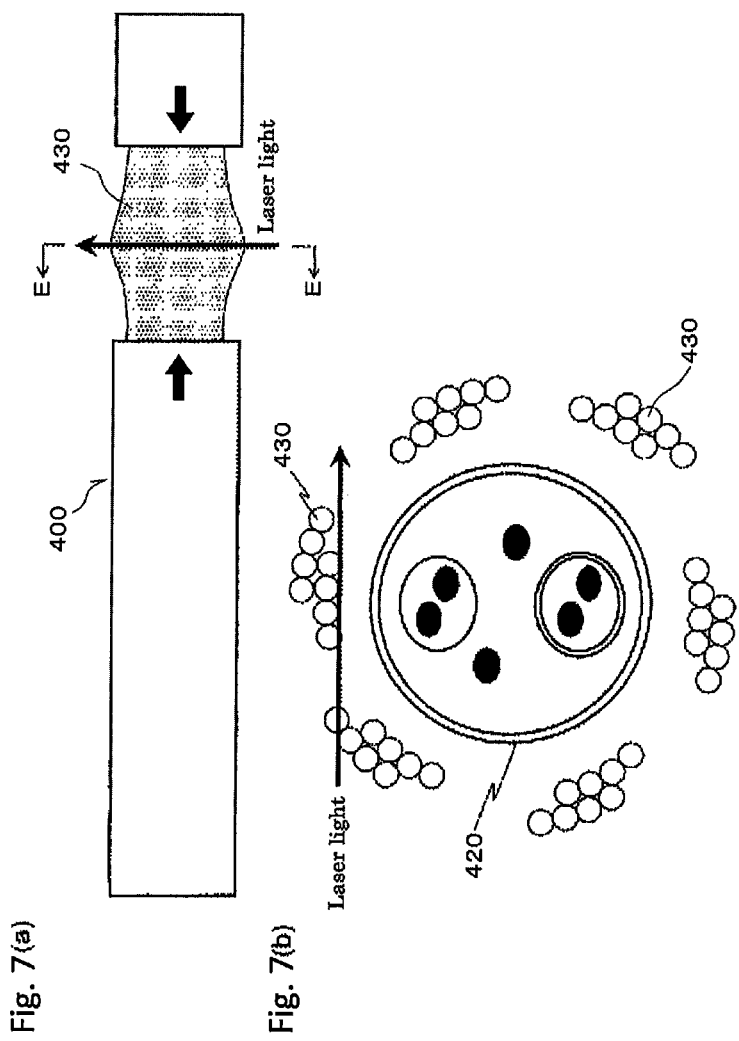
FIG. 7 (a) is a conceptual view showing a process for producing a shield layer-cut electric wire as one example of the background art of the present invention.

Finally, as shown in FIG. 6 (*a*) and FIG. 6 (*b*), when the moving device 320 moves the tip end-side coating layer 42 in the tip end direction (right side in the figure) while gripping the tip end-side coating layer 42, the tip end-side shield layer 37 is also pulled out together with the tip end-side coating layer 42 so that the shield layer-cut electric wire 110 is brought in the state shown in FIG. 1. In the meantime, in FIG. 1, the main body-side shield layer 38 expanding in the radial direction of the electric wire is trimmed.

As described above, the production of the shield layer-cut electric wire 110 is realized by cutting by means of the cutting device 310, movement in the axial direction by means of the moving device 320 and pushing-down of the swollen part 35 of the shield layer 30 by means of the fixing device 330. Therefore, the producing apparatus is simplified, and the number of steps is also reduced, thereby reducing production cost while concurrently improving production efficiency.

In the meantime, the process 200 or apparatus 300 for producing a shield layer-cut electric wire of the present invention is intended not only for the electric wire 10 such as a shield wire, but also for other electric wires and cables having a structure of three layers or more comprising an intermediate layer such as the shield layer 30 and center layers such the insulating layer 20 and the core layer 10, and enables cutting of the internal layer without damaging these center layers.

The process and apparatus for producing a shield layer-cut electric wire of the present invention are not limited to the above-described Examples, and various modified examples and combinations can be adopted within the scope of the claims and embodiments. The present invention also encompasses these modified examples and combinations within the scope of the right.

The invention claimed is:

1. A process for producing a shield layer-cut electric wire from an electric wire having a shield layer and a coating layer applied to the outer periphery thereof, the process comprising,
    making a notch in the coating layer of the electric wire,
    separating the coating layer at the notch in an axial direction so that the shield layer is exposed;
    making the coating layers on both sides of the exposed shield layer approach each other, thereby applying force in the axial direction of the shield layer so that the shield layer becomes swollen in the radial direction of the electric wire;
    pushing down the swollen shield layer toward the outer face of the coating layer; and
    cutting the pushed-down shield layer on the outer face of the coating layer to produce the shield layer-cut electric wire.

2. The process for producing a shield layer-cut electric wire according to claim 1, wherein in the step of pushing down the swollen shield layer toward the outer face of the coating layer,
    the swollen shield layer is pushed down toward the outer face of the separated coating layer.

\* \* \* \* \*